United States Patent
Callard et al.

(10) Patent No.: US 10,028,168 B2
(45) Date of Patent: Jul. 17, 2018

(54) METHOD AND APPARATUS FOR REMOTE BUFFER STATUS MAINTENANCE

(71) Applicants: Aaron James Callard, Ottawa (CA); Sophie Vrzic, Kanata (CA); Philippe Leroux, Ottawa (CA)

(72) Inventors: Aaron James Callard, Ottawa (CA); Sophie Vrzic, Kanata (CA); Philippe Leroux, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 151 days.

(21) Appl. No.: 14/962,317

(22) Filed: Dec. 8, 2015

(65) Prior Publication Data
US 2017/0164229 A1   Jun. 8, 2017

(51) Int. Cl.
*H04W 28/02*   (2009.01)
*H04L 12/925*   (2013.01)

(52) U.S. Cl.
CPC ....... *H04W 28/0278* (2013.01); *H04L 47/722* (2013.01)

(58) Field of Classification Search
CPC combination set(s) only.
See application file for complete search history.

(56) References Cited

U.S. PATENT DOCUMENTS

| | | | | |
|---|---|---|---|---|
| 2010/0135166 A1* | 6/2010 | Ahluwalia | ............... | H04L 47/10 370/252 |
| 2012/0327799 A1* | 12/2012 | Sandlund | .......... | H04W 72/1221 370/252 |
| 2013/0089057 A1 | 4/2013 | Worrall et al. | | |
| 2013/0294337 A1 | 11/2013 | Damnjanovic et al. | | |
| 2014/0160966 A1 | 6/2014 | Kang et al. | | |
| 2015/0327116 A1* | 11/2015 | Zhang | ............... | H04W 72/1284 370/329 |
| 2016/0198491 A1* | 7/2016 | Lee | ................... | H04W 72/1284 455/450 |
| 2017/0034812 A1* | 2/2017 | Deng | .................. | H04W 72/046 |

(Continued)

FOREIGN PATENT DOCUMENTS

| | | |
|---|---|---|
| CN | 10291881 A | 2/2013 |
| WO | 2011160542 A1 | 12/2011 |
| WO | 2013064194 A1 | 5/2013 |

OTHER PUBLICATIONS

International Search Report for International Application No. PCT/CN2016/081747 dated Sep. 21, 2016.

(Continued)

*Primary Examiner* — Yee Lam

(57) ABSTRACT

A method and system for supporting operation of a scheduler by providing indications of communication device transmit buffer status is provided. The indication of buffer status can be generated by a third-party device which is external to both the communication device and the scheduler. In some embodiments matched local and remote models of the buffer are maintained at the communication device and third-party device (or scheduler), respectively. The communication device monitors locally for drift of the model from the actual buffer status. When a level of mismatch in the model is detected, both the local and remote models are updated to mitigate the mismatch.

11 Claims, 7 Drawing Sheets

(56) References Cited

U.S. PATENT DOCUMENTS

2017/0325121 A1* 11/2017 Zhang ............... H04W 28/0278

OTHER PUBLICATIONS

Center for Applied Internet Data Analysis, "Trace Statistics", «http://www.caida.org/data/passive/trace_stats/».
Song, H., "Protocol-Oblivious Forwarding: Unleash the Power of SDN through a Future-Proof Forwarding Plane", «http://conferences.sigcomm.org/sigcomm/2013/papers/hotsdn/p127.pdf».
IETF RFC 4291, "IP Version 6 Addressing Architecture", Feb. 2006, «http://tools.ietf.org/html/rfc4291».
IETF RFC 5213, "Proxy Mobile IPv6", Oct. 2008, «http://tools.ietf.org/html/rfc5213».
IETF RFC 6089, "Flow Bindings in Mobile IPv6", Jan. 2011, «http://tools.ietf.org/html/rfc6089».
IETF RFC 6275, "Mobility Support in IPv6", Jul. 2011, «http://tools.ietf.org/html/rfc6275».
IETF RFC 6437, "IPv6 Flow Label Specification", Nov. 2011, «http://tools.ietf.org/html/rfc6437».
IETF RFC 3954, "Cisco Systems NetFlow Services Export Version 9", Oct. 2004, «https://www.ietf.org/rfc/rfc3954.txt».
Chandrasekaran, B., "Survey of Network Traffic Models," Washington University in St. Louis CSE 567, Nov. 27, 2006 (http://www.cse.wustl.edu/~jain/cse567-06/traffic_models3.htm).
Google, "Quick UDP Internet Connections (QUIC)", «https://en.wikipedia.org/wiki/QUIC». Nov. 2, 2015.
IETF Multi-Protocol Label Switching, «http://datatracker.ietf.org/wg/mpls/». Oct. 16, 2015.
IETF Network Virtualization Overlays, «http://datatracker.ietf.org/wg/nvo3/». Oct. 17, 2015.
IETF Service Function Chaining, «http://datatracker.ietf.org/wg/sfc». Oct. 29, 2015.
Open Networking Foundation, «opennetworking.org». Dec. 1, 2015.

* cited by examiner

METHOD AND APPARATUS FOR REMOTE BUFFER STATUS MAINTENANCE

FIELD OF THE INVENTION

The present invention pertains to the field of data communication networks and in particular to a method and apparatus for maintaining an indication of a device's buffer status at a location remote from the device.

BACKGROUND

Communication network resources, such as wired or wireless communication media, and routing, queueing, and processing resources within the network infrastructure, are typically shared between multiple client devices. It is generally desirable to share these resources between devices in such a way that each device is permitted to communicate in a timely manner. Effectiveness of resource sharing can be improved when resource schedulers have knowledge of the devices which are expected to have data to transmit at a given time. However, determining when each device has data to transmit is not straightforward.

Devices coupled to a communication network often include a transmit buffer which holds messages pending transmission. In LTE systems. Buffer Status Reports (BSRs) can be used to provide the serving evolved NodeB (eNB) with information regarding the amount of data available for transmission in the uplink transmission buffers of a client User Equipment (UE) device. However, communication of BSRs requires potentially significant network overhead.

Therefore there is a need for supporting communication resource sharing that mitigates or obviates one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present invention is to provide a method and apparatus for maintaining an indication of a device's buffer status at a location remote from the device. In accordance with embodiments of the present invention, there is provided a method for facilitating communication for example by supporting operation of a communication network scheduler, comprising: generating, at a third-party computing device, an indication of transmit buffer status of a transmitting communication device, the third-party device being external to both the communication device and the scheduler; and transmitting, by the third-party device, the indication of transmit buffer status to the scheduler via a communication link, the indication of transmit buffer status can be used by the scheduler for scheduling communications from the communication device.

In accordance with embodiments of the present invention, there is provided a method for operating a communication network scheduler, comprising: receiving, by the communication network scheduler, an indication of transmit buffer status of a communication device subject to scheduling by the scheduler, said indication generated by and received from an external device which is external to the communication device and which may be a third party device which is also external to the scheduler, the indication of transmit buffer status received from the third-party device to the scheduler via a communication link; and scheduling communications from the communication device based at least partially on the indication of transmit buffer status.

In accordance with embodiments of the present invention, there is provided a method for scheduling communications from a communication device, comprising: generating an indication of status of a transmit buffer of the communication device, the indication of status generated based on a model of the transmit buffer of the communication device, the model maintained at a device separate from the communication device; providing the indication of status to a scheduler; and scheduling, by the scheduler, communications from the communication device based at least in part on the indication of status.

In accordance with embodiments of the present invention, there is provided a method for maintaining an indication of status of a transmit buffer of a communication device, the method comprising: maintaining a local model of the transmit buffer at the communication device, the local model providing a first copy of the indication of status of the transmit buffer; maintaining a remote model of the transmit buffer at a remote device which is separate from the communication device, the local model and the remote model being matched to each other; monitoring, by a supervisory function operating on the communication device, a difference between the first copy of the indication of status of the transmit buffer and a measurement of status of the transmit buffer of the communication device; and when the difference meets a predetermined threshold criterion, updating the local model and the remote model to mitigate the difference.

In accordance with embodiments of the present invention, there is provided an apparatus for facilitating communication, for example by supporting operation of a communication network scheduler, the apparatus comprising: a buffer status generator configured to generate an indication of transmit buffer status of a transmitting communication device, the apparatus being external to both the communication device and the scheduler; and an interface configured to transmit the indication of transmit buffer status from the apparatus to the scheduler via a communication link, the indication of transmit buffer status used by the scheduler for scheduling communications from the communication device.

In accordance with embodiments of the present invention, there is provided a communication network scheduler comprising: an interface configured to receive an indication of transmit buffer status of a communication device subject to scheduling by the scheduler, said indication generated by and received from a third-party device which is external to both the communication device and the scheduler, the indication of transmit buffer status received from the third-party device to the scheduler via a communication link; the scheduler configured to schedule communications from the communication device based at least partially on the indication of transmit buffer status.

In accordance with embodiments of the present invention, there is provided an apparatus for supporting scheduling of communications from a communication device, comprising: a buffer status generator configured to: maintain a model of a transmit buffer of the communication device; and generate, based on output of the model, an indication of status of the transmit buffer of the communication device; and an interface configured to provide the indication of status to a scheduler, the scheduler configured to schedule communications from the communication device based at least in part on the indication of status. The model may be maintained at a device separate from the communication device.

In accordance with embodiments of the present invention, there is provided a system for providing an indication of status of a transmit buffer of a communication device, the system comprising: a local model of a transmit buffer maintained at the communication device, the local model providing a first copy of the indication of status of the transmit buffer; a remote model of the transmit buffer maintained at the remote device which is separate from the communication device, the remote model providing a second copy of the indication of status of the transmit buffer; a reporting agent configured to obtain and transmit the second copy of the indication of status of the transmit buffer to a scheduler; and a supervisory function operating at least partially on the communication device and configured to: monitor a difference between a measured status of the transmit buffer and the first copy of the indication of status of the transmit buffer; and when the difference meets a predetermined threshold criterion, update the local model and the remote model to mitigate the difference.

BRIEF DESCRIPTION OF THE FIGURES

Further features and advantages of the present invention will become apparent from the following detailed description, taken in combination with the appended drawings, in which.

It will be noted that throughout the appended drawings, like features are identified by like reference numerals.

DETAILED DESCRIPTION

Figure 1A:
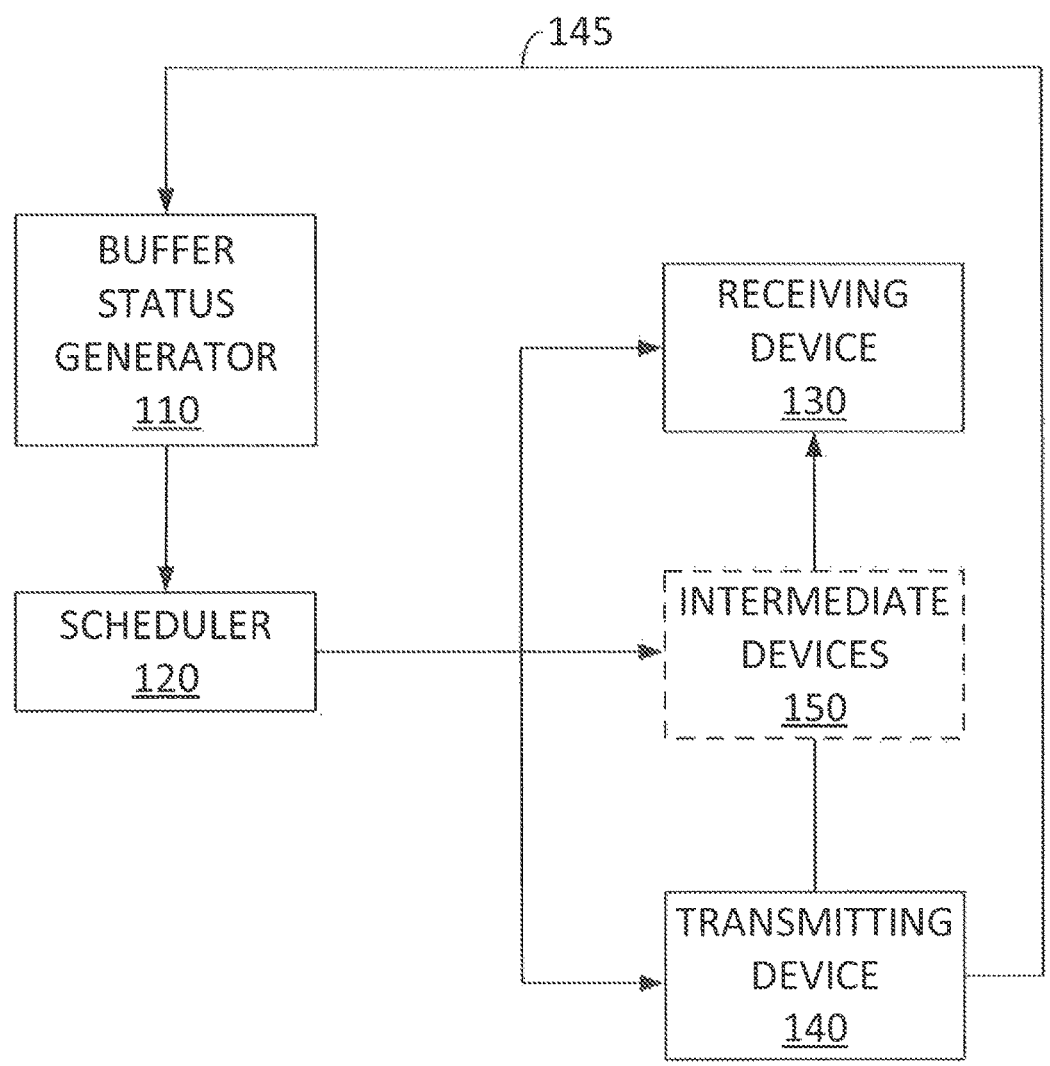
FIG. 1A illustrates a system for scheduling communications between devices, in accordance with embodiments of the present invention.

Embodiments of the present invention relate to communication networks, such as wireless communication networks, cellular communication networks, and next-generation communication networks such as so-called 5G networks.

Embodiments of the present invention relate to remote buffer status maintenance as well as aspects related to scheduling. Remote buffer status maintenance refers to maintaining knowledge of the current size of a transmit buffer, or equivalently the input/output rate of data at the transmit buffer, at a network node remote from the node or device at which the transmit buffer resides. The knowledge of buffer status can be beneficial in systems, such as cellular wireless communication systems, where scheduling of links is performed at a node where the buffer does not reside.

Embodiments of the present invention may be used to support a communication model in which scheduling operation of a transmitter occurs a node other that the transmitter. The scheduler may use the buffer status at the transmitter to determine when to assign resources to a link to be used by the transmitter. Such a model may occur at several time scales and at multiple regions in a communication system.

Embodiments of the present invention support a communication system in which a particular type of traffic follows a pattern. The pattern may not be known to the scheduler a priori. Additionally, revealing that pattern, or changes in that pattern may results in competitive disadvantages to the generator of that traffic. An entity which is potentially external to the scheduler may discern and/or capitalize on the pattern and generate information based on the pattern. The generated information may then be provided to the scheduler for use.

Some embodiments of the present invention relate to the creation of a modular or 'pluggable' buffer status generation apparatus which updates and maintains knowledge of transmit buffer size for one or more particular nodes, and/or for one or more particular type of traffic passing through those nodes.

In some embodiments, multiple sources of buffer updates may be present, each of which can update a node with a buffer status. For example, in a downlink network such as an LTE downlink network or similar type of wireless communication network, a node situated along the downlink data path (the PGW for instance) may send information to the buffer status generator indicating an increase in the buffer size when that packet reaches the wireless access node, such as an eNB. This information may be combined with additional information from the access node itself to determine the current buffer size. The additional information may be retrieved from other messages such as indication handover, or application layer information such as a change in video quality or an action taken by the user (e.g. pausing a video, stopping an upload). In a multi-hop wireless network a node may overhear the buffer status messages of other nodes. If those nodes are upstream (i.e. those nodes will be transmitting to the node with the buffer of interest) that data may be taken into account to update the current buffer model. A computing device can therefore track transmit buffer status of another communication device based at least partially on the buffer status messages of yet further communication devices which are expected to transmit buffer to said other communication device. This allows the computing device to anticipate receipt of data at the communication device potentially before it occurs.

In embodiments of the present invention, a model of buffer behaviour is provided and duplicated at both at the node at which the transmit buffer resides and at a node remote from the transmit buffer. By comparing the status of the actual buffer to the status of the locally modeled buffer, the modelling error can be determined. Model updates, such as conveyed by correction messages or other buffer status update messages, are then sent to the remote node only when the locally-determined model error is at an unacceptable level.

In some embodiments, the model error is considered acceptable or unacceptable on the basis of the absolute or relative difference between the modeled buffer size and the actual buffer size. The relative difference can correspond to a ratio of the absolute difference in buffer size to the actual buffer size. In some embodiments, the model error is considered acceptable or unacceptable on the basis of an analysis of the difference between scheduling decisions which would be made on the basis of the modeled buffer size and scheduling decisions which would be made on the basis of the actual buffer size. If the same or acceptably similar decisions would be made in both cases, then the model error may be considered acceptable.

Embodiments of the present invention relate to a method and system for buffer status maintenance in a multi-hop environment. As mentioned above, in the multi-hop environment, buffer status maintenance may be based at least partially on an observation of the status of networked devices which potentially transmit data toward the buffer for which status is being maintained. Further, rather than explicitly feeding back the buffer status at periodic or triggered intervals, a remote model of the buffer is maintained and used to provide the buffer status.

In some embodiments, the use of buffer models at remote nodes potentially allows for non-causal scheduling using predicted communication device traffic. The remote node predicts the buffer status and provides the prediction from an accessible network location. This can in turn allow for reduced signalling times, and improved performance. The buffer model is typically an active model which evolves autonomously in time, rather than being a simple sample-and-hold system which merely repeats back the last reported buffer status.

In some embodiments, the use of buffer models at remote nodes allows for reduced signalling overhead. This can be particularly important for reducing overhead of constrained out-of-band links.

Embodiments of the present invention provide a method and apparatus for providing an indication of communication device buffer status, also referred to as a buffer status indication, to a communication network scheduler. In certain embodiments, the buffer status indication is generated at a device which is external to both the communication device and the scheduler, referred to herein as a third-party device. An indication of buffer status may refer to the amount of data held in the buffer (also referred to as the buffer size), a change in the amount of data held in the buffer, or the like. The indication of buffer status may be precise or approximate. A device which is external to the communication device, but possibly integrated with the scheduler, is referred to herein as a remote device. The status of one device being external to another may refer to the two devices being differently located in the network such that communication therebetween requires communication through the network, or other external communication. The buffer status indication is provided from the third-party device to the scheduler via a communication link. The communication device buffer may be generic to all data to be transmitted by the device, or specific to one or more applications, or traffic classes being supported by the device.

In various embodiments, the generation of the buffer status indication at a remote device, which is potentially a third-party device, allows the buffer status indication to originate at a location from which the indication can be readily transmitted to the scheduler. For example, the buffer status indication can be generated at a third-party device within the backhaul network which is coupled to the scheduler via a data link with relatively high-bandwidth, low per-bit transmission overhead and low-latency.

In various embodiments, the generation of the buffer status indication at a device which is external to the scheduler, such as a third-party device, allows for a modular approach to generating buffer status indications. For example, the particular means and methods for generating buffer status indications can be adjusted without adjusting the scheduler itself. As such, the means and methods can be externalized from the scheduler. The scheduler can therefore be standardized without requiring standardization of the buffer status generation approach. A standard messaging format for communicating buffer status indications to the scheduler can be used, regardless of how buffer status indications are generated. The standard messaging format may include a standard message structure, standard data field format, standard specification for how often buffer status indications are provided, etc. As an example, adjusting how buffer status indications are generated can be performed in response to the adoption of a new communication protocol (such as a transport protocol), protocol version, or application which causes an adjustment to device transmission behaviour. As another example, adjusting how buffer status indications are generated can be performed in response to device behaviour variations based on time of day, time of week, time of month, time of year, predictable or unpredictable events, consumer trends, regulatory changes, etc.

In some embodiments, the buffer status indications are provided by a model which estimates current buffer status of a communication device and is maintained by a remote device, which in some embodiments is a third-party device. In some embodiments, generation of buffer status indications is application specific. That is, the manner in which buffer status indications are generated may depend on the application or applications which the buffer supports (by storing data packets generated by such applications). Applications may include VoIP applications, video applications, HTTP pulls, etc. The nature of the application or applications being supported can be used to infer or estimate buffer status and its evolution over time.

In some embodiments, buffer status indications generated by a third-party device can be communicated to the scheduler using one-way messaging over a transport layer such as a TCP/IP layer. For example, a remote application agent may push buffer status indications to the scheduler, potentially without the scheduler specifically requesting each buffer status indication.

In some embodiments, buffer status indications generated by a third-party device can be communicated to the scheduler using two-way messaging, for example using get-based Application Programming Interface (API) calls. For example, the scheduler can request buffer status updates from the remote application agent over an API interface.

In various embodiments, the scheduler can use the buffer status indications as a basis for scheduling communication of the buffered data from the communication device. For example, the communication schedule can be developed to accommodate, with varying priorities, devices with non-empty buffers, devices with buffered data exceeding a predetermined threshold, or devices with incipient buffer overflow events. Devices with low buffer levels or incipient buffer underflow events can be de-prioritized. Scheduling communication of data can include reserving physical communication media resources, such as resource blocks, time slots, radio frequency bands, setting up links and routing paths, and communicating uplink resource grants to devices.

Embodiments of the present invention provide a method and apparatus for scheduling communication of data from a communication device, based on a buffer status indication received from a third-party device. The buffer status indication is received in a predetermined message format which is known to the scheduler. The scheduler then parses the buffer status indication and determines a resource schedule based at least in part on data contained within the buffer status indication.

In various embodiments, scheduling can be based on received buffer status indications pertaining to multiple communication devices. Typically, the scheduler will determine buffer status indications for the multiple devices, and schedule an allocation of communication resources based on these buffer status indications. For example, the schedule may be configured to serve those devices for which a non-empty buffer is reported, potentially prioritizing devices with relatively fuller buffers.

In some embodiments, multiple third-party or remote devices provide buffer status indications to the same scheduler. Each third-party or remote device can provide buffer status indications for different sets of communication devices.

Embodiments of the present invention allow for an application to be more active in directing how messaging is performed. Communication to the scheduler, for example in order to influence scheduling decisions, may be customizable to particular devices and use cases. Rather than basing buffer size and traffic predictions on general models, device or application-specific models can be used for different devices. This may reduce model complexity while improving accuracy, for example by avoiding use of a model of broad applicability in favour of a selection of relatively specialized models. Further, when device buffer size modeling is performed at and reported from a remote device, power demands on the device and latency in buffer size reports to the scheduler may be reduced.

FIG. 1A illustrates a system for scheduling communications between a first (receiving) device 130 and a second (transmitting) device 140, in accordance with embodiments of the present invention. The first device 130 may be a wireless access point, wireless router, base station, or similar device. The second device 140 may be a mobile device, client terminal, UE, or similar device. More generally, the first device and the second device may be any two devices capable of communication over a network whose communication links are mediated by the scheduler. The communication links may include wireless communication links, wired communication links, optical communication links, or a combination thereof. Scheduled resources may include time slots, frequency bands, spreading codes, etc. Scheduling is typically required when a shared access medium, such as a wireless radio environment, wired or optical communication link, or infrastructure such as a switch or router, needs to accommodate multiple communication links.

The system includes a buffer status generator 110 and a scheduler 120, which are illustrated as separate devices in the communication network infrastructure. That is, in the present embodiment, the buffer status generator 110 corresponds to a third-party device. The buffer status generator is configured to generate a buffer status indication of the current transmit buffer status of the second device. The buffer status indication may be generated based on a model of the second device's transmit buffer, rather than via direct observation of buffer status. The buffer status generator is further configured to transmit the buffer status indication to the scheduler 120 via a communication link. The scheduler is configured to receive the buffer status indication, and to schedule communications between the first device and the second device based at least in part on the buffer status indication provided to the scheduler.

In various embodiments, the scheduler is configured to schedule the communications by passing scheduling control messages to relevant entities, such as the first device 130 and the second device 140 over a control channel. When the first device is an access point, control messages may be passed to the second device 140 via the access point. Control messages may correspond for example to resource reservation messages, uplink grants, or the like.

In some embodiments, the scheduler is further configured to schedule the communications by passing scheduling control messages to intermediate devices 150 such as routers, traffic engineering nodes, etc., which lie on the communication path between the first device 130 and the second device 140. Such intermediate devices may not be present when the first and second devices communicate directly. The scheduling control messages may be used by these other devices to reserve device resources for supporting communications from the second device to the first device.

In some embodiments, the buffer status generator 110 receives information 145 from the second (transmitting) device 140. The information is indicative of buffer status at the second device. This information may be transmitted by the second device on an as-needed basis. The buffer status generator can use the information to update a buffer model held by the buffer status generator in response to a determination at the second device that the buffer model's accuracy is no longer acceptable. The information may be provided in the form of correction messages.

Figure 1B:
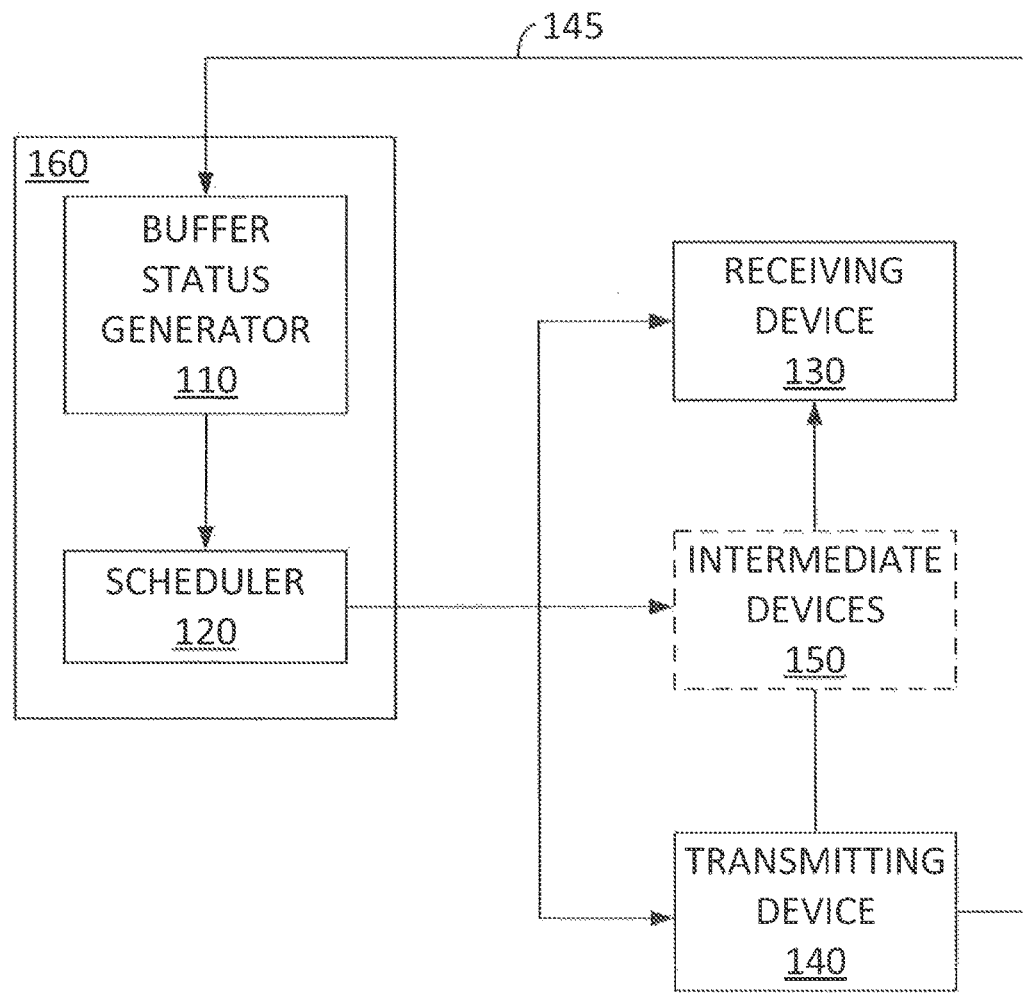
FIG. 1B illustrates another system for scheduling communications between devices, in accordance with embodiments of the present invention.

FIG. 1B illustrates a system for scheduling communications between a first device 130 and a second device 140, in accordance with other embodiments of the present invention. The system of FIG. 1B is comparable to the system of FIG. 1A, except that the buffer status generator 110 and the scheduler 120 are integrated into a common device 160. That is, the buffer status generator 110 corresponds to a remote device but not to a third-party device.

Figure 2:
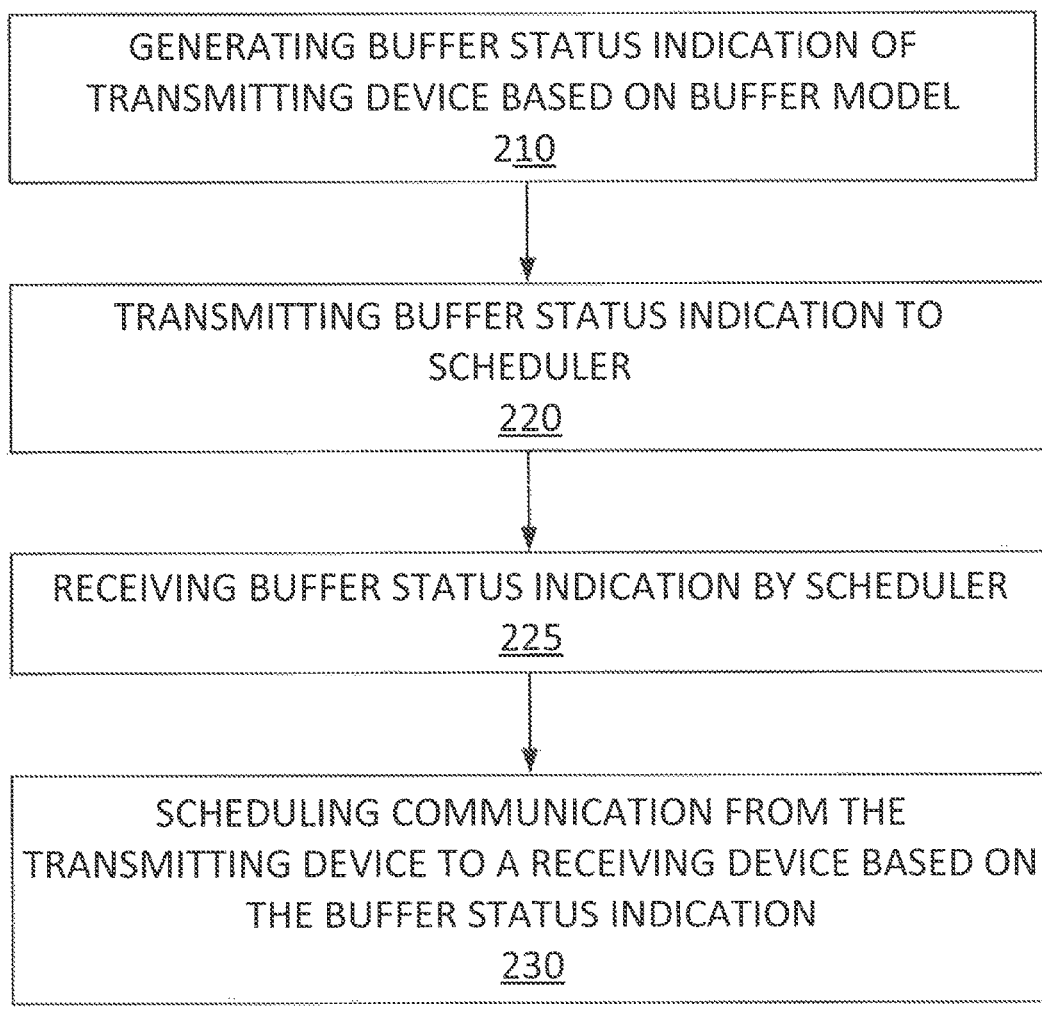
FIG. 2 illustrates a method for scheduling communications between a first device and a second device, in accordance with embodiments of the present invention.

FIG. 2 illustrates a method for scheduling communications between a first device and a second device, in accordance with embodiments of the present invention. The first device may be a wireless access point, wireless router, base station, or similar device, and the second device may be a mobile device, client terminal, UE, or similar device. The scheduled communications may be uplink communications from the second device to the first device. The method includes generating 210 a buffer status indication corresponding to the current transmit buffer status of the second (transmitting) device. The buffer status indication is generated based on a model of the buffer of the second device rather than direct observation of the buffer status.

The method further includes transmitting 220 the buffer status indication to a scheduler, and receiving 225 the buffer status indication by the scheduler. In some embodiments, the buffer status indication is generated at a third-party device. In this case the buffer status indication can be transmitted over a communication link, for example using data packets transmitted via a control plane of the communication network. Alternatively, if the buffer status indication is generated at a device integrated with the scheduler, transmitting the buffer status indication to the scheduler and receiving the buffer status indication by the scheduler may involve intra-scheduler communication, for example, by writing the buffer status indication to a computer memory location accessible by the scheduler, and subsequently reading the memory location by the scheduler.

The method further includes scheduling 230, by the scheduler, communications between the first (receiving) device and the second (transmitting) device based at least in part on the buffer status indication provided to the scheduler. The scheduled communications may correspond to uplink communications transmitted from the second device to the first device.

Various embodiments of the present invention relate to portions of the method as illustrated in FIG. 2. In particular, some embodiments correspond to generating and transmitting the buffer status indication. Other embodiments correspond to receiving the buffer status indication from a third-party device and scheduling communication based on the received buffer status indication.

Figure 3:
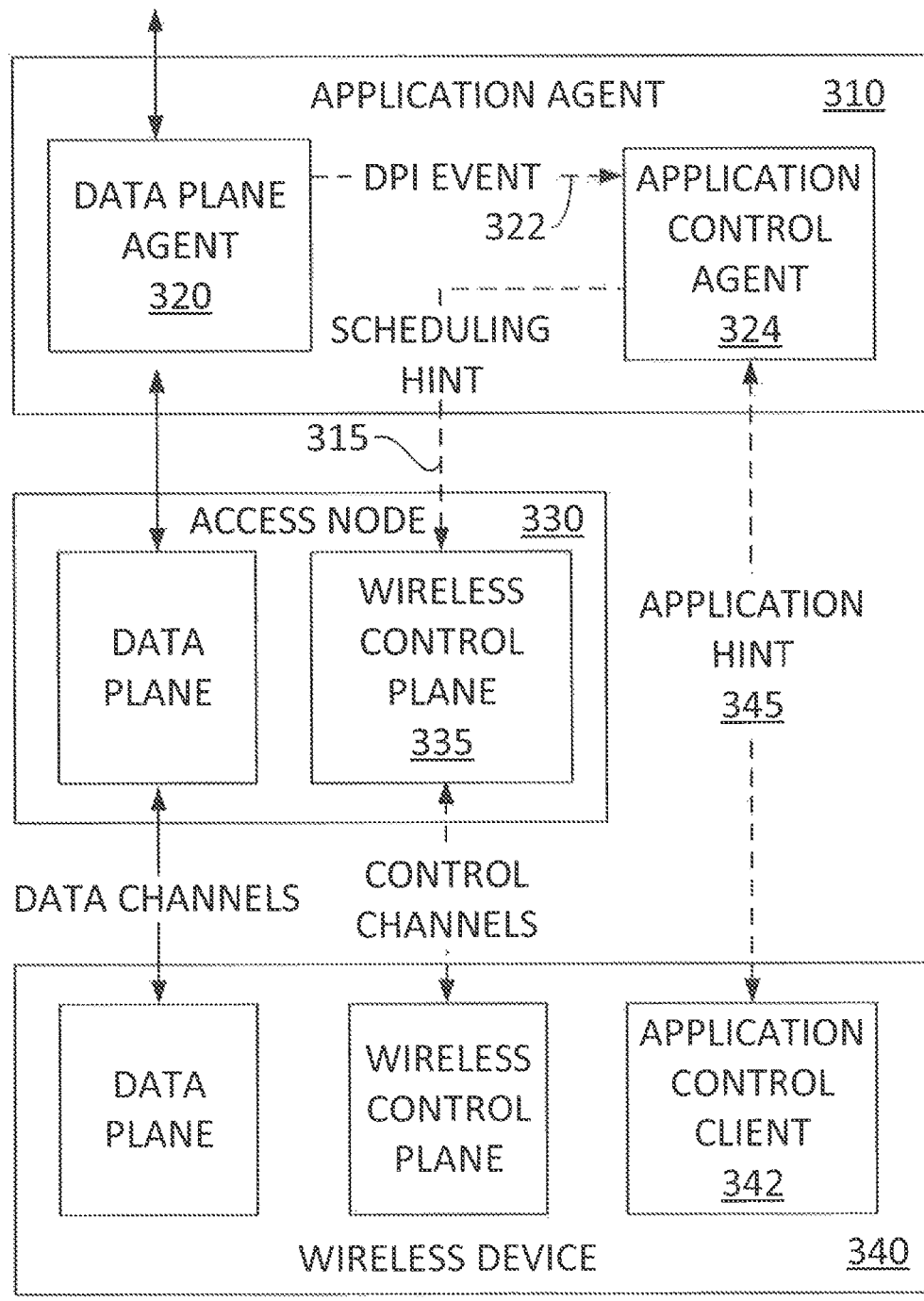
FIG. 3 illustrates a system for scheduling communications between an Access Node and a wireless device, in accordance with embodiments of the present invention.

FIG. 3 illustrates a system for scheduling communications between an Access Node 330 and a wireless device 340, in accordance with embodiments of the present invention. The communications are typically uplink communications but may potentially include downlink communications in some circumstances. Communication between the access node and the wireless device involves data plane communication over data channels and control plane communication over control channels. Control plane communication includes scheduling messages transmitted over the control channels from a scheduler included within a wireless control plane 335 of the Access Node 330. Data plane communications from the wireless device to the access node are scheduled and transmitted according to these scheduling messages.

Some embodiments of the present invention may be used to schedule downlink communications. For example, the present invention may be employed when the scheduler is at a different location in the network from a node which transmits downlink data and which is subject to scheduling by the scheduler. Such a scenario occurs for example in Coordinated Multi-point (CoMP) communication systems or other systems in which multiple nodes cooperate to transmit downlink data, or in networks with a joint scheduler. A joint scheduler can refer to a node which performs scheduling duties for multiple nodes.

The system of FIG. 3 includes an Application Agent 310, which may perform buffer status generation and/or related operations. Logical channels, including both data plane and control plane components, are provided connecting the Application Agent 310, the Access Node 330 and the wireless device 340. The Application Agent may be instantiated in the network at the remote location or alternatively integrated into the Access Node 330. The Application agent includes a Data Plane Agent 320 which monitors uplink data plane communications between the wireless device and the Access Node. Monitoring can include intercepting the data packets transmitted by the wireless device by the Data Plane Agent. For example, the Data Plane Agent can act as a node of a multi-hop communication link through which the data packets pass, and hence can receive and forward the transmitted data packets. The Data Plane Agent 320 may perform Deep Packet Inspection (DPI) on uplink data packets transmitted by the wireless device, for example those passing through the Data Plane Agent. The DPI may trigger DPI events 322 which are forwarded for handling by an Application Control Agent 324 of the Application Agent 310. DPI may be used to monitor the amount of data transmitted from the wireless device, and hence to infer removal of data from the wireless device buffer over time. A DPI event corresponds to information detected in a packet that is relevant to the amount of data transmitted along the path of the packet or another path (i.e. the reverse link). The DPI event may be indicative of an observed or predicted change in data transmission behaviour. For example, a DPI event may be triggered upon detection of a TCP packet having an Explicit Congestion Notification (ECN) flag, and the DPI event would indicate a reduction in future data rate. Packet retransmissions based on inspection of sequence numbers may also be detected and trigger a DPI event. As another example, a packet carrying an HTTP Get command may trigger a DPI event.

Additionally or alternatively, the Application Agent may monitor scheduling messages transmitted from the Access Node to the wireless device in order to infer data transmission events from the wireless device and hence infer removal of data from the wireless device buffer.

The Application Control Agent 324 is configured to provide "scheduling hint" information 315 to the Access Node 330. The information 315 may include an indication of transmit buffer status of the wireless device 340, as estimated by the Application Control Agent. Estimation of the transmit buffer status may be performed using a buffer status model maintained by the Application Control Agent.

The Application Control Agent 324 is configured to receive "application hint" information 345 from the wireless device 340. The information 345 may include a correction message for adjusting the Application Control Agent's estimate of wireless device transmit buffer status. The information 345 may be generated by an Application Control Client 342 operating in the wireless device 340. For example, as will be described below, the Application Control Client 342 may maintain a local copy of the same buffer status model as the Application Control Agent, and generate correction messages in response to a determination that the buffer status indicated in the local copy of the buffer status model differs from the true buffer status by at least a given absolute amount or relative amount.

Various embodiments of the present invention relate to portions of the systems as illustrated in FIGS. 1A, 1B and 3. In particular, some embodiments correspond to a buffer status generator configured to generate and transmit the buffer status indication to the scheduler. Other embodiments correspond to a scheduler configured to receive the buffer status indication from the buffer status generator and schedule communication based on the received buffer status indication.

Embodiments of the present invention provide a method and apparatus for generating an indication of communication device buffer status at a remote device. A model of the buffer status, referred to herein as the remote model, is maintained at the remote device, which may be a network node. The remote model can operate autonomously for a period of time to maintain an indication of current buffer status of the communication device, based on an input model structure and parameters. Buffer status models can accept a time value as input and produce as output a buffer status indication, such as a size of a modeled transmit buffer, which is current to the input time value. The buffer status model should be configured to represent the true status of the transmit buffer being modeled to a predetermined degree of accuracy.

A supervisory function operating within the communication device anticipates whether the remote model's buffer status differs from the true buffer status by an undesired amount, and transmits a correction message to the remote device for use in reducing the error in the remote model's buffer status. In various embodiments, a local copy of the buffer status model, referred to herein as the local model, is maintained, and the supervisory function compares the buffer status as indicated by local model to actual buffer status of the communication device. Since the local model and the actual buffer are co-located in the communication device, such a comparison can be readily performed. The local model and the remote model are configured to have substantially identical outputs, for example by use of identical model structure and parameters. As such, in some embodiments, the error in the local model is expected to be an accurate reflection of the concurrent error in the remote model.

The supervisory function is configured to initiate an update to both the local model and the remote model when an unacceptable amount of error is detected in the local model as compared to the actual buffer status. The update may be conveyed via correction messages. The correction messages may synchronize the buffer status value held by the model to reflect the actual buffer status. In some embodiments, the correction message may adjust parameters of the buffer status model. The parameters may be adjusted so as to reduce error in the buffer status model going forward. In some embodiments, the correction message may re-initialize the buffer status model with a new initial buffer size valid at a new initial time.

Figure 4:
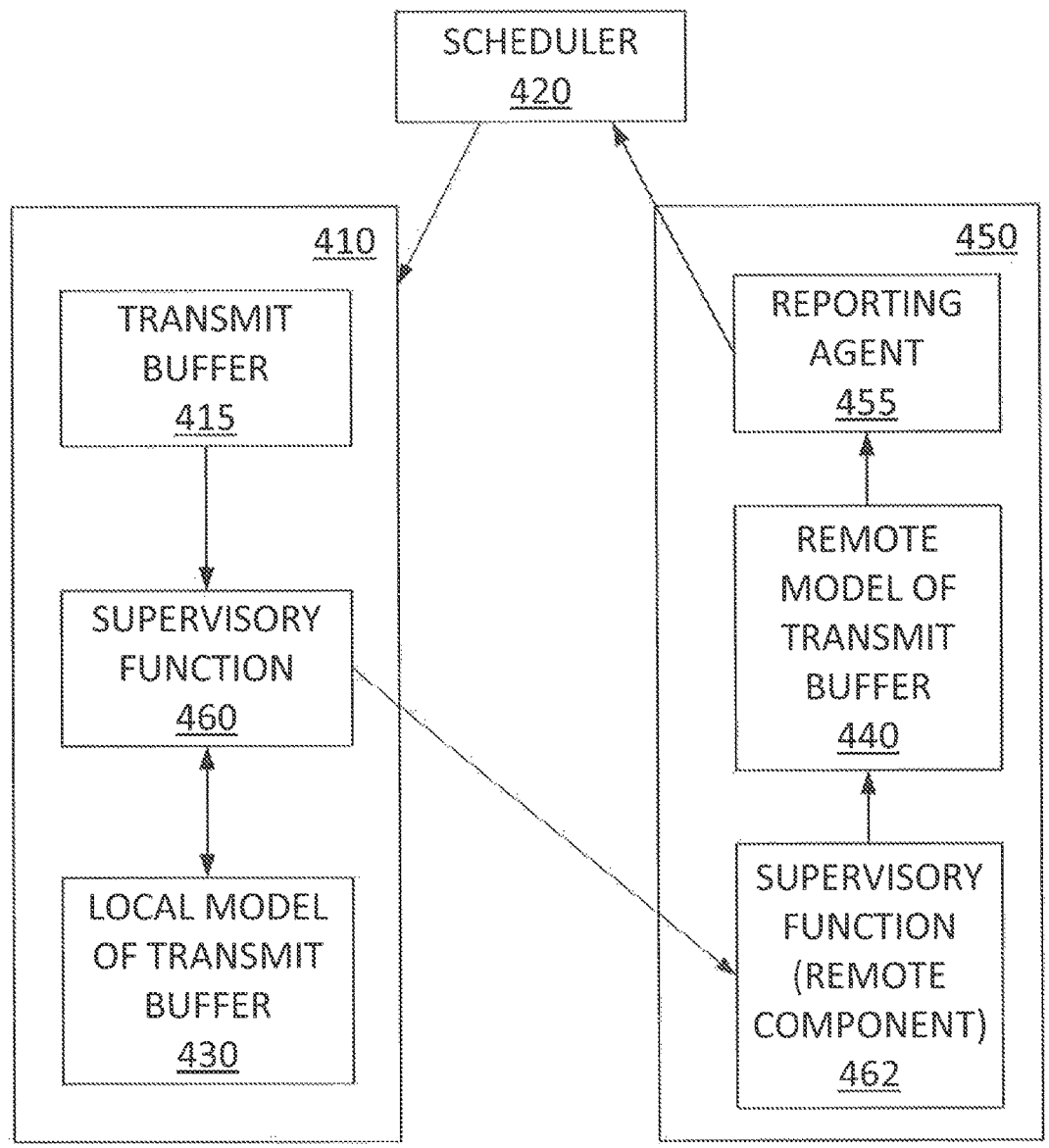
FIG. 4 illustrates a system for providing, at a remote device, an indication of status of a transmit buffer of a communication device separate from the remote device, in accordance with an embodiment of the present invention.

Accordingly, FIG. 4 illustrates a system for providing, at a remote device, an indication of status of a transmit buffer of a communication device 410 separate from the remote device, in accordance with an embodiment of the present invention. The communication device 410 has a transmit buffer 415, and transmission of data from the transmit buffer is moderated by a scheduler 420, for example which notifies the communication device 410 of when to transmit and which resources to use. The system includes a local model 430 of the transmit buffer which is maintained at the communication device. The system further includes a remote model 440 of the transmit buffer which is maintained at a remote device 450. The local and remote models are matched to each other. The remote device is separate from the communication device and may be integrated with the scheduler 420 or reside in a core portion of the communication network, for example as a third-party device.

The remote model 440 provides the indication of transmit buffer status. The system may further include a buffer reporting agent 455 which receives the indication of transmit buffer status from the remote model 440 and transmits this indication to the scheduler 420. The scheduler may then perform scheduling based at least in part on the provided indication.

The system further comprises a supervisory function 460 operating on the communication device 410. The supervisory function is configured to measure the status of the transmit buffer 415 as well as the output of the local model 430. The supervisory function is further configured to monitor a difference between the measured transmit buffer status and the output of the local model which also provides a modeled indication of transmit buffer status. The supervisory function is further configured, when the difference meets the predetermined threshold criterion, to update the local model and the remote model to mitigate the difference between the indication of the transmit buffer status provided by the local model and the measurement of the transmit buffer status of the communication device. In some embodiments, the supervisory function includes a remote component 462 operating on the remote device 450, which acts to receive and handle the updates, for example in the form of correction messages, from the supervisory function 460 of the communication device.

Figure 5:
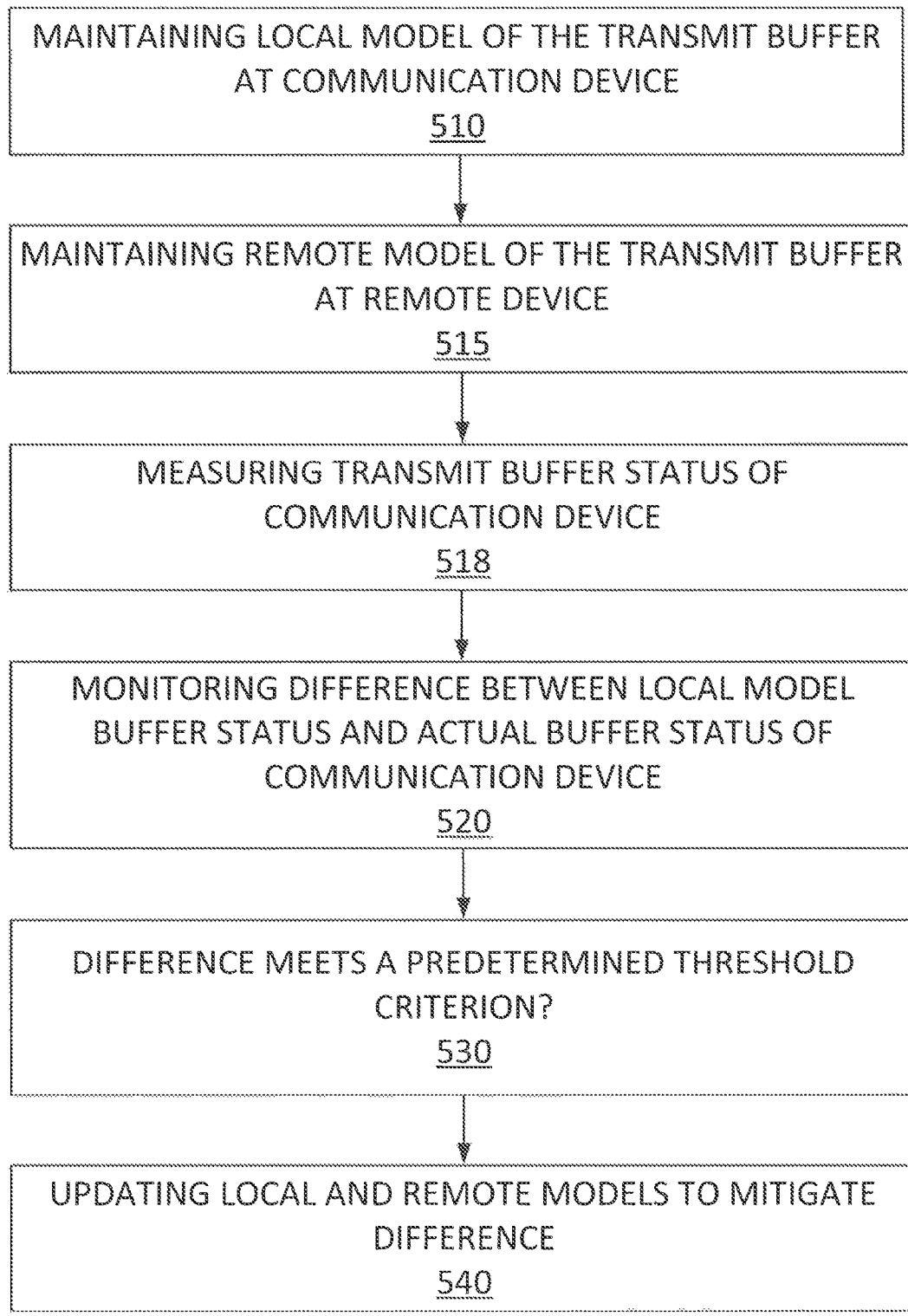
FIG. 5 illustrates a method for providing, at a remote device, an indication of status of a transmit buffer of a communication device separate from the remote device, in accordance with an embodiment of the present invention.

Accordingly, FIG. 5 illustrates a method for providing, at a remote device, an indication of status of a transmit buffer of a communication device separate from the remote device, in accordance with an embodiment of the present invention. The method includes maintaining 510 a local model of the transmit buffer at the communication device for which status of the transmit buffer is to be maintained. The communication device may be configured to perform maintenance of the local model of the transmit buffer for example by configuration of computer components thereof. The method further includes maintaining 515 a remote model of the transmit buffer at the remote device. The local model and the remote model are matched to each other, so as to provide substantially identical indications of the transmit buffer status. The method further includes monitoring 520, by a supervisory function of the communication device, a difference between an indication of the transmit buffer status provided by the local model and a measurement of the transmit buffer status of the communication device. As such, the method may include measuring 518 the transmit buffer status of the communication device. The method further includes determining 530, by the supervisory function, whether the difference meets a predetermined threshold criterion, and when the difference meets the predetermined threshold criterion, updating 540 the local model and the remote model to mitigate the difference between the indication of the transmit buffer status provided by the local model and the measurement of the transmit buffer status of the communication device. Mitigation may involve updating the states of the models, updating the parameters of the models, or both. The threshold criterion may be set by the supervisory function, an administrator, or an automatic administrative function. Setting the threshold criterion at a lower level results in closer synchronization of the local and remote models, but requires more communication overhead due to more frequent updates. Setting of the threshold can be performed via control messages passed to the supervisory function.

In some embodiments, the remote device is integrated with the scheduler. In other embodiments, the remote device is a third-party device, that is, a device which is communicatively coupled to the scheduler and provides buffer status indications thereto.

Embodiments of the present invention provide an indication of current buffer status to the scheduler using relatively low overhead. For example, buffer status indications are generated at a remote device which is either located close to the scheduler in network terms or which is co-located with the scheduler. As such, the buffer status indications do not have to traverse the entire path from communication device to scheduler. Further, correction messages are transmitted to the remote device only when necessary, thereby limiting the amount of data flowing from the communication device to the remote device.

Embodiments of the present invention are capable of providing an indication of current buffer status with relatively low feedback delay. For example, because the indication of buffer status is generated at a location close to or integral to the scheduler, the buffer status information is more current than would be the case if the indication of buffer status were generated at the communication device where the buffer actually resides. A reduction in feedback delay may allow the scheduler access to a more current indication of communication device buffer status, thus allowing an improvement to scheduling decision quality.

In some embodiments, the communication device buffer status model, which corresponds to both the local model and the remote model, can take the following form:

$$B'(t)=B_0+r*t-S(0,t), \quad (1)$$

where B'(t) is the buffer size at time t, time t is the amount of time elapsed since a selected initial time 0, $B_0$ is the buffer size at the initial time 0, r is the rate at which data arrives at the buffer, and S(0,t) is the amount of data scheduled to be transmitted from the buffer between time 0 and time t.

The values of the above parameters can be determined in a variety of ways. The initial buffer size $B_0$ can be reported directly at an initialization time. In some embodiments the initialization time can be selected as a time following a predetermined time period in which the communication device does not transmit for a predetermined time period, and the initial buffer size $B_0$ can accordingly be set to zero. The rate r may be determined based on knowledge of the types of traffic being generated by the communication device, such as constant bit rate traffic with an associated bit rate. This in turn may be determined based on knowledge of applications operating on the communication device, the role of the communication device, and the like.

In some embodiments, the rate r may be a fixed value. In other embodiments, the rate r may be variable. For example, r may be updated periodically, or r may be a function of one or more variables, such as time since initial time 0, time of day, network status, device status, amount of data already sent, etc.

The amount of data scheduled to be transmitted S(0,t) may be provided by analyzing output of the scheduler pertaining to the scheduling of communications from the communication device. This output is expected to be readily accessible to the local model of buffer status, since the communication device will receive information pertaining to the scheduling of communications from the communication device as a matter of normal functioning. This output is also expected to be readily accessible to the remote model of buffer status, since the remote device maintaining the remote model is typically selected to be "close to" the scheduler in the sense that the remote (e.g. third-party) device and the scheduler are both within the network infrastructure and connected by a relatively low-latency, low-cost and high-bandwidth link, or alternatively in that the remote model is maintained by the scheduler itself. Alternatively, the amount of data scheduled to be transmitted S(0,t) may be determined by analyzing the actual transmissions from the communication device, for example using Packet Inspection techniques.

In various embodiments, the supervisory function operating within the communication device is configured to track the accuracy of the buffer status model as follows. The actual buffer size at time t, denoted B(t) is obtained by direct observation of the communication device buffer, for example by analyzing the buffer memory or transmitting a query to the buffer manager. For the same time t, the output B'(t) is obtained from the local model of buffer status. The error at time t is then defined as:

$$\mathrm{Err}(t) = B'(t) - B(t) \tag{2}$$

The supervisory function may be configured to track the error at predetermined time intervals, which may be fixed or variable. The time intervals may be functions of other parameters, such as network load, QoS requirements, and connection history. Shorter time intervals may result in more timely correction of buffer status model drift, at the expense of higher computational overhead.

In various embodiments, the supervisory function is configured to initiate a buffer model correction operation in response to a function of Err(t) satisfying a predetermined condition. In one embodiment, the predetermined condition corresponds to the instantaneous value of Err(t) rising above a predetermined positive threshold value or falling below a predetermined negative threshold value. In one embodiment, the predetermined condition corresponds to a time-averaged value, such as a moving average value, of Err(t) rising above a predetermined positive threshold value or falling below a predetermined negative threshold value. Various functions of Err(i) may be used to trigger the model correction operation. For example, a function of Err(t) may correspond to a weighted combination of some or all of: the instantaneous value of Err(t), a rate of change of Err(t), a history of values of Err(t), and a predicted future value of Err(t). When the function of Err(t) meets a predetermined condition indicative that the buffer model is an inadequate representation of the actual buffer size, the model correction operation may be triggered.

In some embodiments, the predetermined condition indicative that the modeled buffer status is an inadequate representation of the actual buffer status corresponds to Err(t) falling outside of a predetermined range.

In some embodiments, the predetermined condition indicative that the modeled buffer status is an inadequate representation of the actual buffer status corresponds to a ratio of Err(t) to B(t) falling outside of a predetermined range. This may be indicative that the model error exceeds a predetermined threshold value which is relative to the current buffer size.

In some embodiments the predetermined range may be configured based at least in part on a cost of performing a correction operation. For example, correction operations may be avoided until the error Err(t) exceeds a threshold value which increases with the amount of disruption a correction operation would create. In some embodiments, a correction term and a soft value indicative of importance of correction may be generated. Other entities of the network would receive this correction term and determine whether to pass it onward (or initiate the correction operation) based on the importance of correction. The transmission of the correction term is fed back to the supervisory function, for example either through an acknowledgement of the receipt from the remote model, or from an indication of the local entity in charge of determining if the correction message is passed along or not. The entities mentioned above may be network nodes, software elements, or other control elements operating in the network. In various embodiments, at least some of the entities may reside in the MAC layer of terminal devices (UEs) of the network.

In another embodiment, a fixed size of correction term may be provided and the supervisory function adjusts its behaviour according to an amount of resources provided.

In some embodiments, the threshold value or range can be adjusted over time, for example by the supervisory function.

In some embodiments, the predetermined condition indicative that the modeled buffer status is an inadequate representation of the actual buffer status corresponds to a condition that scheduling decisions that would be made on the basis of the modeled buffer status differ, by a predetermined degree, from scheduling decisions that would be made on the basis of the actual buffer status. As such, the predetermined condition may correspond to reaching a threshold amount of impact that the buffer status error has on scheduling decisions made by the scheduler.

For example, the supervisory function can compare the scheduling decisions that would be made if the scheduler was informed of the true buffer status to the scheduling decisions that would be made if the scheduler was informed of the modeled buffer status. A correction message may then be sent if the difference between these two scheduling decisions is deemed significant. The difference may be measured for example in terms of uplink data rates, latency, etc. This calculation of what is significant may be performed at the supervisory function or indicated to it from external sources. For instance the scheduler may calculate a significance threshold for comparison against an indicator of the significance of difference between the two scheduling decisions. Correction may be initiated when the indicator of significance exceeds the significance threshold.

As such, some embodiments of the present invention are configured to consider what the impact of the scheduling decisions based on the modeled buffer status will be. If the modeled buffer status is incorrect, but the decision based on the modeled buffer status agrees to a predetermined extent with the decision that would be taken if the modeled buffer status was correct, then a correction operation may be omitted at that time. For example the current model may, due to model error, cause several resources to be prematurely released. However as long as this release does not cause undue buffer buildup then the model error may be considered acceptable.

In various embodiments, and as mentioned above, the correction operation involves resetting the current buffer size or other indicators of the dynamically changing state of the model, and potentially adjusting other model parameters. The details of the correction operation may depend on the particulars of the model being used. Examples of correction operations include: updating the buffer status of the model, changing the model's incoming data rates, changing the model's outgoing data rates, changing a probability distributions of data rates used by the model (for models which support solutions which optimize over probabilities), changing link rates used by the model, and changing communication schedules incorporated into the model. As another example, the correction operation may initiate a change in state of the model from one form to another, for example from a talking state to a listening state in the case of an audio application, or from a moving state to a still state in the case of video codecs.

Various modeling approaches can be used for modeling the buffer status of a communication device. The model can be generic or specific to a device type, application type, transport layer type, etc. Modeling approaches may include token bucket models, TCP models, Quick UDP Internet Connection (QUIC) models, Markov models, etc. The model may account for data incoming to the buffer separately from data transmitted from the buffer. In some embodiments, for example in accordance with multi-homing, the model may account for data being transmitted from the buffer via multiple different uplink paths.

As an example, an embodiment of the present invention relates to modeling buffer status for a device running an application which is similar to Voice over IP (VoIP). The application may rely on semi-static scheduling to accommodate a requirement for regular, pre-booked uplink communication resource usage. The semi-static scheduling may further be used to accommodate keep-alive messages, for example.

As another example, an embodiment of the present invention relates to modeling buffer status for a device operating a transport protocol which uses packet pacing (such as QUIC), in this instance the traffic in a transmit buffer is added to in predictable rates which can be well modeled.

In some embodiments, communication may originate from multiple different entities, and buffer updates can come from multiple sources. For example, buffer updates to the scheduler may originate from a Gateway node when downlink communications are being scheduled. Buffer updates may be based on information received from different network entities, such as buffer status messages from upstream nodes. As another example, buffer updates to the scheduler may originate from an application, rather than from the buffer itself.

In some embodiments, rather than or in addition to directly modeling buffer status, the status of an application supported by the communication device can be modeled. The application results in generation of data traffic to and/or from the communication device. The model of buffer status may incorporate the status of the application. The model can anticipate when the application is expected to present data for transmission, and scheduling can be adjusted based on this output of the model. A local model of the application and a remote model of the application can be kept and correction messages may be initiated to correct the models on the basis of observed differences between the application's state and the state of the local model.

Figure 6:
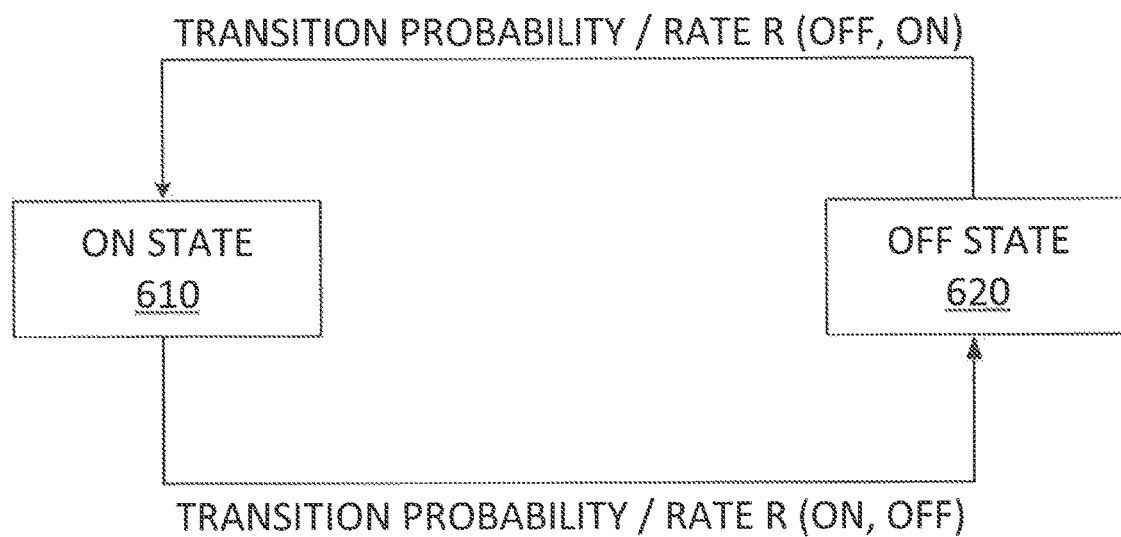
FIG. 6 illustrates an example of a traffic model used in accordance with embodiments of the present invention.

FIG. 6 illustrates an example of a traffic model used in accordance with embodiments of the present invention. The traffic source can be in either an ON state 610 or an OFF state 620. Data traffic is generated at a specified rate when the source is in the ON state, and is not generated (or generated at a lower rate) when the source is in the OFF state. The specified rate may be an average rate, for example. The model may correspond to a two-state discrete-time or continuous time Markov chain, with specified transition probabilities r(ON,OFF), r(OFF,ON) (or transition rates) for transitioning from the ON state to the OFF state and vice-versa. Other types of traffic models may be used as would be readily understood by a worker skilled in the art, for example as described in B. Chandrasekaran, "Survey of Network Traffic Models," Washington University in St. Louis CSE 567, (2009).

In some embodiments, the buffer model includes several components, which may correspond to sub-models. A first component represents a modeled flow of data traffic into the buffer. This corresponds substantially to the rate of traffic into the buffer. For the downlink case, this flow corresponds to data travelling through the network to a given node, the buffer belonging to a node in the network, and then from the node to the end communication device. For the uplink case, this flow corresponds to data travelling from a communication device having the buffer to the network. Various embodiments such as described above relate to the uplink case, including modeling of data input into a buffer. A second component represents the current buffer size. This can be represented by a scalar value, or by a more complicated array or vector value for cases where prioritization, flushing or other aspects are supported. Buffer overflow events and/or empty buffer events can also be modeled. A third component represents a modeled flow of data traffic out of the buffer. A fourth component represents the manner in which the node transmits data, including data transmissions controlled by the current scheduler and data transmissions controlled by other schedulers in the network.

In the example of a wireless node in a scheduled medium (for example in an LTE system or comparable structured wireless communication system) the modeled flow of traffic into the buffer and the current buffer size may be provided using the examples above (e.g. a two-state Markov model). The modeled flow of data traffic out of the buffer may be defined by the uplink or downlink grants sent by the scheduler. For instance if the scheduler issues a grant for 1000 bits, then the modeled buffer size decreases by 1000 bits. As both the supervisory function and the model of the buffer are aware (explicitly or implicitly) of this grant, the two models can be kept synchronized. If the model of the buffer is unaware of the specific grants sent (because it is located elsewhere in the network) then other models for flow of the data traffic out of the buffer may be used. Simple models such as an average rate over time, may be sufficient for many circumstances.

In a wireless communication network with fully dynamic scheduling, the model may potentially be quite complex. For a network implementing scheduled communication with more structure, the model may be less complex. In either case, it is considered that even less than perfectly accurate models may still provide an acceptable level of performance over existing approaches. The introduction of a model correction operation allows for such less accurate models to be employed.

In an example embodiment, the traffic to be transmitted by the communication device/node is modelled as a simple constant rate traffic source. For example, the buffer may increase by a fixed amount every time slot. The buffer status model is updated every time slot. The model considers the schedule, and, if a link is assigned for a current time slot, the transmit buffer size is increased or decreased by an amount related to the incoming or outgoing data transmission rate, depending on whether the link is leaving or entering the node. Buffer sizes are thresholded at zero and are potentially accorded a maximum size. In some embodiments, the transmit buffers at neighbouring nodes may also be incorporated into the buffer model, potentially increasing complexity but also model accuracy.

In some embodiments, when a scheduling event changes the schedule, for example such that some network resources are unused, the buffer model can receive this information and adjust the modeled buffer status based on same.

In some embodiments, adaptive models of buffer status may be employed. Such models may include parameters which adapt over time. For example, data rates can be moving average data rates.

In some embodiments, statistical or probabilistic models of buffer status may be employed. Buffer status statistics may captured and compared, or may be provided as the outcome of a calculation, such as a probability of underflow/overflow calculation.

In some embodiments, buffer models may be updated in response to observations of other events in the network which are anticipated to potentially result in a change in the modeled buffer status. For example, when a chain of nodes exists in which data transmitted from a first node will likely pass through a series of intermediate nodes to reach the node having the modeled buffer, and transmission of data is detected at the first node, then the modeled buffer status may be updated in order to reflect the anticipated receipt of the data. In one embodiment, the modeled buffer status may be updated based on an observation that l bits of data is anticipated to be received due to an observation that k bits of data has been transmitted from a prior node in the chain. In one embodiment, l may be equal to k. In another embodiment, l may equal k multiplied by a probability that the k bits will actually reach the modeled buffer.

In some embodiments, models may be updated based on non-causal predictions. For example, based on a current buffer size of x, the model may be updated with an expectation that y more bits will be received at a future time t.

In various embodiments, multiple copies of a buffer status model can be provided at multiple nodes. Each copy of the model may be substantially identical and the same model inputs may be provided concurrently to each copy, in order to facilitate model synchronization. In some cases, three or more copies of the buffer status model may be provided at three or more nodes.

In various embodiments, upon determining that parameters of the model are to change, an update message indicative of the changed parameters is communicated amongst all nodes at which a copy of the model resides. In one embodiment, temporary models may be generated and used until confirmation of parameter update has been received.

In some embodiments, multiple different models of a single transmit buffer may be provided. A model may be considered different if it includes a different set of inputs and/or different parameters or parameter values, for example. The methods and systems described herein may be applied to each of the different models.

Some embodiments of the present invention provide a method for scheduling communications from a communication device, comprising: generating an indication of status of a transmit buffer of the communication device, the indication of status generated based on a model of the transmit buffer of the communication device, the model maintained at a device separate from the communication device; and providing the indication of status to a scheduler, the scheduler configured to schedule communications from the communication device based at least in part on the indication of status. The device may be external to the scheduler or alternatively integrated into the scheduler. A corresponding communication network scheduler may also be provided.

Some embodiments of the present invention provide a method for monitoring status of a transmit buffer of a communication device, the method comprising: maintaining a remote model of the transmit buffer at a remote device which is separate from the communication device, the remote model being matched to a local model of the transmit buffer, the local model being maintained at the communication device and providing a first copy of the indication of status of the transmit buffer; monitoring, by a supervisory function operating on the communication device, a difference between the first copy of the indication of status of the transmit buffer and a measurement of status of the transmit buffer of the communication device; and when the difference meets a predetermined threshold criterion, updating the local model and the remote model to mitigate the difference. The method may further comprise maintaining the local model. A corresponding apparatus and/or system may also be provided. The system may include the local model, the remote model, and the supervisory function.

In some embodiments, in relation to a method, system or apparatus for providing an indication of status of a transmit buffer, an interface is provided which is configured to transmit a further indication of status of the transmit buffer, generated by the remote model, to a scheduler. In some embodiments, generating the indication of status of the transmit buffer by the local model and the remote model comprises performing deep packet inspection on data packets transmitted from or transmitted to the communication device, and adjusting one or both of the local model and the remote model based on said deep packet inspection. In some embodiments, each of the local model and the remote model incorporates a first sub-model indicative of data received by the buffer and a second sub-model indicative of data transmitted from the buffer. In some embodiments, each of the local model and the remote model are updated based on a prediction of a future change to transmit buffer status. In some embodiments, the difference corresponds to a difference between a modeled buffer size indicated by the local model and an actual buffer size corresponding to the measurement of status of the transmit buffer, and the threshold criterion is indicative of one of: a condition that the difference exceeds an absolute threshold; and a condition that the difference relative to the actual buffer size exceeds a relative threshold. In some embodiments, the threshold criterion is indicative that scheduling decisions that would be made on the basis of the first copy of the indication of status of the transmit buffer differ, to a predetermined degree, from scheduling decisions that would be made on the basis of the measurement of status of the transmit buffer. In some embodiments, the local model and the remote model incorporate a model of an application supported by the communication device, operation of the application resulting in data traffic transmitted to or from the communication device.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments of the present invention. For example, such an execution may correspond to a simulation of the logical operations as described herein. The software product may additionally or alternatively include number of instructions that enable a computer device to execute operations for configuring or programming a digital logic apparatus in accordance with embodiments of the present invention.

Various elements of the present invention can be implemented using computing devices, network interfaces, and other components of devices associated with a communication network such as a wireless communication network. Various aspects of the present invention can be implemented using a microprocessor operatively coupled to memory. For example, a local or remote model of buffer status can be maintained by executing a set of instructions by a processor to manipulate data values stored in memory indicative of buffer status. The manipulation can be based on the data values indicative of buffer status as well as other data values stored in memory indicative of model parameters.

As another example, the supervisory function and buffer reporting agent can be implemented by execution of program instructions by a microprocessor operatively coupled to memory and further by use of a network interface such as wireless interface configured to facilitate communication between devices.

The communication device, remote device and scheduler as described herein may each include a network interface, microprocessor, and memory. Configuration of these components to operate in accordance with the present invention may be performed at least in part by appropriately configuring operation of the microprocessor, for example via provision of program instructions for execution thereby. For the remote device and scheduler, these components may be real or virtualized.

Alternatively, in some embodiments, data processing facilities other than a microprocessor can be used and configured. Such data processing facilities may include dedicated electronic components such as FPGAs, ASICs, microcontrollers, etc. Microprocessors and memory components may be real or virtualized.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

What is claimed is:

1. A method for facilitating communication, comprising:
generating, by a third party device, an indication of transmit buffer status of a transmitting communication device, the third party device being external to both the transmitting communication device and a scheduler; and
transmitting, by the third party device, the indication of transmit buffer status to a the scheduler,
wherein the indication of transmit buffer status indicates a current buffer status of the transmitting communication device,
and wherein generating the indication of transmit buffer status comprises:
maintaining, at the transmitting communication device, a local model of a transmit buffer of the transmitting communication device, the local model providing a first copy of the indication of transmit buffer status;
monitoring, by a supervisory function operating on the transmitting communication device, a difference between the first copy of the indication of transmit buffer status and a measurement of status of the transmit buffer; and
when the difference meets a predetermined threshold criterion, updating the local model to mitigate the difference; and triggering an update of a remote model of the transmit buffer of the transmitting communication device, the remote model maintained by the third party device and matched to the local model, the remote model providing the indication of transmit buffer status.

2. The method of claim 1, wherein generating the indication of transmit buffer status further comprises:
performing, by the third party device, deep packet inspection on data packets transmitted from or transmitted to the transmitting communication device, the data packets intercepted by the third party device, and adjusting the local model and the remote model based on said deep packet inspection.

3. The method of claim 1, wherein the local model and the remote model of the transmit buffer each incorporate a first sub-model indicative of data received by the transmit buffer and a second sub-model indicative of data transmitted from the transmit buffer.

4. A method for facilitating communication, comprising:
generating, by a third party device, an indication of transmit buffer status of a transmitting communication device, the third party device being external to both the transmitting communication device and a scheduler; and
transmitting, by the third party device, the indication of transmit buffer status to a the scheduler,
wherein the indication of transmit buffer status indicates a current buffer status of the transmitting communication device,
and wherein generating the indication of transmit buffer status comprises:
maintaining a remote model of a transmit buffer, of the transmitting communication device, at the third party device, the remote model providing the indication of transmit buffer status, wherein maintaining the remote model comprises:
- matching the remote model to a local model of the transmit buffer, the local model being maintained at the transmitting communication device and providing a first copy of the indication of transmit buffer status;
- receiving an indication, from a supervisory function operating on the transmitting communication device, that a difference between the first copy of the indication of transmit buffer status and a measurement of status of the transmit buffer meets a predetermined threshold criterion; and
- upon receiving said indication, updating the remote model to mitigate the difference.

5. The method of claim 4, wherein generating the indication of transmit buffer status further comprises performing deep packet inspection on data packets transmitted from or transmitted to the transmitting communication device, the data packets intercepted by the third party device, and adjusting the indication of transmit buffer status based on said deep packet inspection.

6. The method of claim 4, wherein the indication of transmit buffer status comprises a prediction of the transmit buffer status at a future time.

7. An apparatus for facilitating communication, the apparatus comprising:
- a buffer status generator configured to generate an indication of transmit buffer status of a transmitting communication device, the apparatus being external to both the transmitting communication device and a scheduler; and
- an interface configured to transmit the indication of transmit buffer status to the scheduler, wherein the indication of transmit buffer status indicates a current buffer status of the transmitting communication device, wherein the buffer status generator is further configured to:
- maintain a remote model of a transmit buffer, of the transmitting communication device, at the apparatus, the remote model providing the indication of transmit buffer status, wherein maintaining the remote model comprises:
  - matching the remote model to a local model of the transmit buffer, the local model being maintained at the transmitting communication device and providing a first copy of the indication of transmit buffer status;
  - receiving an indication, from a supervisory function operating on the transmitting communication device, that a difference between the first copy of the indication of transmit buffer status and a measurement of status of the transmit buffer meets a predetermined threshold criterion; and
  - upon receiving said indication, updating the remote model to mitigate the difference.

8. The apparatus of claim 7, wherein the buffer status generator is further configured to:
- intercept data packets transmitted from or transmitted to the transmitting communication device;
- perform deep packet inspection on the data packets; and
- adjust the local model and the remote model based on said deep packet inspection.

9. The apparatus of claim 7, wherein the local model and the remote model of the transmit buffer each incorporates a first sub-model indicative of data received by the transmit buffer and a second sub-model indicative of data transmitted from the transmit buffer.

10. The apparatus of claim 7, wherein the buffer status generator is further configured to:
- intercept data packets transmitted from or transmitted to the transmitting communication device;
- perform deep packet inspection on the data packets; and
- adjust the indication of transmit buffer status based on said deep packet inspection.

11. The apparatus of claim 7, wherein the buffer status generator is further configured to provide the indication of transmit buffer status as a prediction of the transmit buffer status at a future time.

* * * * *

UNITED STATES PATENT AND TRADEMARK OFFICE
CERTIFICATE OF CORRECTION

PATENT NO. : 10,028,168 B2
APPLICATION NO. : 14/962317
DATED : July 17, 2018
INVENTOR(S) : Aaron Callard, Sophie Vrzic and Philippe Leroux Page 1 of 1

It is certified that error appears in the above-identified patent and that said Letters Patent is hereby corrected as shown below:

In the Claims

Claim 1, "to a the scheduler," should read --to the scheduler,--

Claim 4, "to a the scheduler," should read --to the scheduler,--

Signed and Sealed this
Twenty-third Day of October, 2018

Andrei Iancu
*Director of the United States Patent and Trademark Office*